United States Patent
Bosch et al.

(10) Patent No.: US 9,161,205 B2
(45) Date of Patent: Oct. 13, 2015

(54) ROUTE OPTIMIZATION AT A PACKET DATA SWITCH NODE

(75) Inventors: Peter Bosch, New Providence, NJ (US); Paul Anthony Polakos, Marlboro, NJ (US); Ajay Rajkumar, Morristown, NJ (US); Sampath Rangarajan, Bridgewater, NJ (US)

(73) Assignee: Alcatel Lucent, Boulogne-Bilancourt (FR)

( * ) Notice: Subject to any disclaimer, the term of this patent is extended or adjusted under 35 U.S.C. 154(b) by 2171 days.

(21) Appl. No.: 11/354,212

(22) Filed: Feb. 14, 2006

(65) Prior Publication Data
US 2007/0189309 A1    Aug. 16, 2007

(51) Int. Cl.
| | |
|---|---|
| H04W 8/08 | (2009.01) |
| H04L 12/701 | (2013.01) |
| H04W 8/26 | (2009.01) |
| H04W 40/00 | (2009.01) |
| H04W 80/04 | (2009.01) |
| H04W 92/02 | (2009.01) |

(52) U.S. Cl.
CPC ............... *H04W 8/082* (2013.01); *H04L 45/00* (2013.01); *H04W 8/085* (2013.01); *H04W 8/26* (2013.01); *H04W 40/00* (2013.01); *H04W 80/04* (2013.01); *H04W 92/02* (2013.01)

(58) Field of Classification Search
USPC ......... 370/230, 392, 328, 329, 236, 352, 467, 370/401; 455/433, 445, 432
See application file for complete search history.

(56) References Cited

U.S. PATENT DOCUMENTS

| | | | | |
|---|---|---|---|---|
| 6,490,259 | B1 * | 12/2002 | Agrawal et al. ............... | 370/331 |
| 6,584,098 | B1 * | 6/2003 | Dutnall ......................... | 370/354 |
| 6,839,337 | B2 * | 1/2005 | Newberg et al. .............. | 370/338 |
| 6,987,771 | B2 * | 1/2006 | Shimizu et al. ............... | 370/401 |
| 6,999,437 | B2 * | 2/2006 | Krishnamurthi et al. ...... | 370/331 |
| 7,284,068 | B1 * | 10/2007 | Ramalho ....................... | 709/245 |
| 7,464,177 | B2 * | 12/2008 | Shimizu ........................ | 709/238 |
| 7,483,697 | B2 * | 1/2009 | Ohki .......................... | 455/432.1 |
| 7,720,057 | B2 * | 5/2010 | Igarashi ........................ | 370/389 |
| 2002/0009066 | A1 * | 1/2002 | Shimizu et al. ............... | 370/338 |
| 2002/0147820 | A1 * | 10/2002 | Yokote .......................... | 709/229 |
| 2002/0154638 | A1 * | 10/2002 | Shahrier et al. ............... | 370/400 |
| 2004/0047322 | A1 * | 3/2004 | O'Neill ......................... | 370/338 |
| 2004/0062254 | A1 * | 4/2004 | Kuzhiyil et al. .............. | 370/401 |
| 2004/0117508 | A1 * | 6/2004 | Shimizu ........................ | 709/249 |

(Continued)

FOREIGN PATENT DOCUMENTS

| | | | | |
|---|---|---|---|---|
| EP | 1161032 A2 | 5/2001 | ............. | H04L 12/56 |
| EP | 1161032 A2 * | 12/2001 | ............. | H04L 12/56 |

(Continued)

OTHER PUBLICATIONS

RFC1661, Simpson, W., The Point-to-Point Protocol (PPP), Jul. 1994.*

(Continued)

*Primary Examiner* — Ayaz Sheikh
*Assistant Examiner* — Faiyazkhan Ghafoerkhan
(74) *Attorney, Agent, or Firm* — Davidson Sheehan LLP

(57) ABSTRACT

The present invention provides a method of route optimization. The method may include obtaining a packet associated with a first address associated, by a home agent, with a first mobile unit and routing the packet to a second address associated with a second mobile unit along a forward link of a communication path that bypasses the home agent.

9 Claims, 2 Drawing Sheets

(56) References Cited

U.S. PATENT DOCUMENTS

| | | | |
|---|---|---|---|
| 2004/0137888 A1* | 7/2004 | Ohki | 455/417 |
| 2004/0170125 A1* | 9/2004 | O'Neill | 370/230 |
| 2004/0228335 A1* | 11/2004 | Park et al. | 370/352 |
| 2004/0242233 A1* | 12/2004 | Lutgen | 455/445 |
| 2005/0164729 A1* | 7/2005 | Narayanan et al. | 455/522 |
| 2005/0174984 A1* | 8/2005 | O'Neill | 370/349 |
| 2006/0133337 A1* | 6/2006 | An et al. | 370/338 |

FOREIGN PATENT DOCUMENTS

| | | | |
|---|---|---|---|
| WO | WO 2004/055993 A2 | | 1/2004 |
| WO | WO 2004055993 A2 | * | 7/2004 |

OTHER PUBLICATIONS

International PCT Search Report PCT/US2007/003377 dated Sep. 13, 2007.

* cited by examiner

ROUTE OPTIMIZATION AT A PACKET DATA SWITCH NODE

BACKGROUND OF THE INVENTION

1. Field of the Invention

This invention relates generally to communication systems, and, more particularly, to wireless communication systems.

2. Description of the Related Art

A wireless network typically consists of a plethora of network elements that collectively provide data and voice communications for nomadic users through a macro-cellular environment. For example, a conventional Evolution, Data-Optimized (EvDO) cellular network includes one or more base transceiver stations (BTS), radio network controllers (RNC), packet data switch nodes (PDSN), foreign agents (FA) and home agents (HA). In the EvDO network, the BTS provides radio access to nomadic access terminals, the RNC provides for radio channel mobility, the PDSN maintains an Internet Protocol-Point to Point Protocol (IP-PPP) tunnel between the PDSN and the access terminal. Lastly the HA and FA provide macro-mobility functionality for nomadic access terminals. In a typical cellular network, there are many BTSs, relatively fewer RNCs, PDSNs and FAs, and still fewer HAs.

Data transmission between the PDSN and the mobile terminal is byte oriented, while data transmission between the PDSN and the HA is based on transmitting whole IP packets. To transmit packets, such as IP version 4 (IPv4) packets, between the home network (i.e. HA) and the PDSN, the HA tunnels the IP packets to the FA by way of an IP-in-IP tunnel, e.g., by extending the IP packets with an additional header indicating an address of the FA. Once a packet is received by the FA, the FA transmits the packet to the PDSN for further delivery to the access terminal over a PPP tunnel between the PDSN and the access terminal. The PDSN and FA are typically co-located to simplify delivery of IP packets to the appropriate PPP tunnels. Conversely, packets transmitted by the access terminal are forwarded to the PDSN/FA over a PPP tunnel, which may then transmit the packets via an IP-in-IP tunnel to the home agent for eventual transmission onto an external network, such as an Internet. Thus, packets transmitted on either the uplink or downlink will be transmitted to the home agent before reaching their final destination.

A substantial fraction of the calls within a wireless communication system are generally thought to be local calls. This means that a voice call originating within a particular geographic area is also likely to terminate in the same geographic area. However, voice calls that are handled using various Internet protocols need to take a circuitous route that may take individual packets far from their point of origin before returning to nearly the same location. For example, the voice samples for Voice over Internet Protocol (VoIP) calls are encoded in RTP/UDP/IP packets and are routed between source and destination through standard IP routing mechanisms. Thus, the packets transmitted between source and destination access terminals are still routed back by way of a BTS, RNC, PDSN and foreign agent to the home agent even if the source and/or destination access terminals have roamed away from their home networks. This is a particularly inefficient way to route voice traffic given that it is assumed a fraction of voice calls in a cellular network are local and that a packet typically travels through a relatively large network (i.e., distance and number of network elements) before it reaches its home agent.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for route optimization. The method may include obtaining a packet associated with a first address associated, by a home agent, with a first mobile unit and routing the packet to a second address associated with a second mobile unit along a forward link of a communication path that bypasses the home agent.

BRIEF DESCRIPTION OF THE DRAWINGS

The invention may be understood by reference to the following description taken in conjunction with the accompanying drawings, in which like reference numerals identify like elements, and in which.

Figure 1:
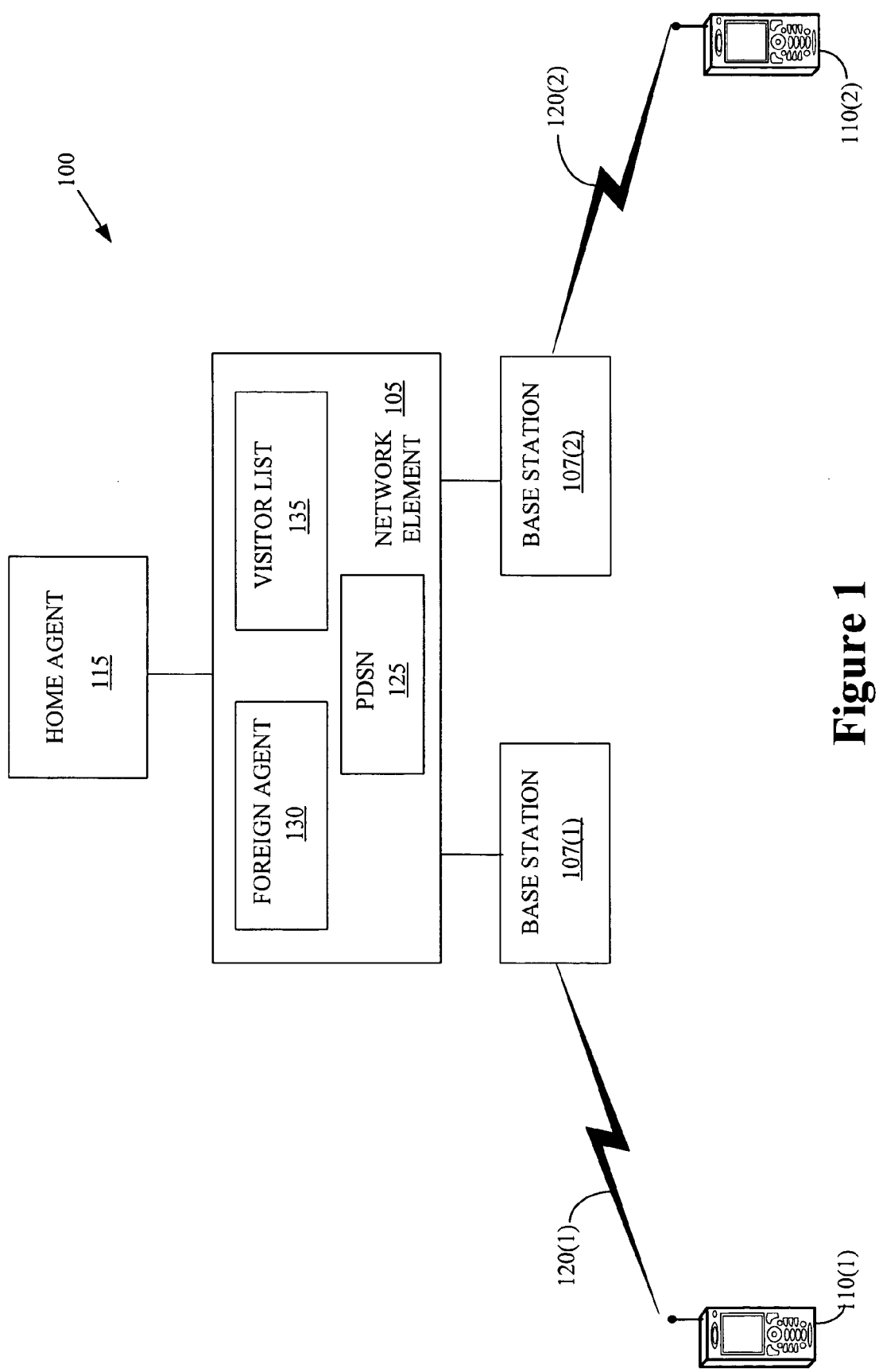
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communications system 100. In the illustrated embodiment, the wireless communications system 100 may provide wireless connectivity according to third generation wireless communication protocols. Examples of wireless communications systems 100 that operate according to third generation wireless protocols include, but are not limited to Evolution, Data Optimized (EvDO) systems and Universal Mobile Telecommunication Systems (UMTS). However, persons of ordinary skill in the art should appreciate that the present invention is not limited to a wireless communications system 100 that operates according to EvDO and/or UMTS standards or protocols. In alternative embodiments, any wireless communication protocol may be used to provide wireless connectivity. Furthermore, in some embodiments, the wireless communications system 100 may include, or be connected to, one or more wired communication systems.

The wireless communications system 100 shown in FIG. 1 may include wireless system comprised of a collection of network elements 105 that may provide one or more endpoints (or termination points) for an Internet protocol communication path. Persons of ordinary skill in the art having benefit of the present disclosure should appreciate that the network elements 105 may be implemented in any combination of hardware, firmware, and/or software and may be implemented in one or more locations. The wireless system 100 may also include one or more base stations 107 that provide a wireless communication path with access terminals 110. In the interest of clarity, the indices (1-2) may hereinafter be dropped when the base stations 107 and/or access terminals 110 are being referred to collectively. However, the indices (1-2) may be used when referring to the base stations 107 and/or the access terminals 110 individually or to a subset of the base stations 107 and/or the access terminals 110. The same convention may be used with regard to other indices that distinguish between components that share an identifying numeral.

Although only one network element 105, two base stations 107, and two access terminals 110 are shown in FIG. 1, persons of ordinary skill in the art should appreciate that the present invention is not limited to this exemplary embodiment. In alternative embodiments, any number of network element 105, base stations 107, and/or access terminals 110 may be deployed in the wireless communication system 100. Persons of ordinary skill in the art having benefit of the present disclosure should also appreciate that the present invention is not limited to embodiments that include the particular embodiment of the network element 105 shown in FIG. 1. In alternative embodiments, other entities may be used to terminate the IP communication path. For example, the IP communication path may be terminated by a base station, a radio network controller, a serving general packet radio service (GPRS) support node (SGSN), and the like.

The network element 105 and one or more of the base stations 107 may provide wireless connectivity to one or more access terminals 110. The access terminals 110 may be any type of access terminal including, but not limited to, cellular telephones, personal data assistants, and laptop computers. However, persons of ordinary skill in the art having benefit of the present disclosure should appreciate that the present invention is not limited to these particular examples of access terminals 110 and in alternative embodiments other types of access terminals 110 may also be used. Persons of ordinary skill in the art should also appreciate that the access terminals 110 may be referred to using other terms such as mobile unit, mobile shell, user equipment, user terminal, mobile terminal, subscriber station, subscriber terminal, and the like.

The access terminals 110 register with a home agent 115, which assigns an address to each of the access terminals 110. In one embodiment, the assigned address is an Internet address such as an IPv4 home address (HoA). However, the present invention is not limited to assigning IPv4 home addresses. In alternative embodiments, other Internet addresses, such as IPv6 addresses, may be assigned to one or more of the access terminals 110. Although a single home agent 115 is depicted in FIG. 1, persons of ordinary skill in the art having benefit of the present disclosure should appreciate that the wireless communication system 100 may include more than one home agent 115, and/or a single home agent 115 that may be implemented at one or more locations, and that the access terminals 110 may register with any home agent 115 in the wireless communication system 100.

The access terminals 110 shown in the illustrated embodiment have established communication links with respective network element 105 over air interfaces 120 by way of base stations 107. Techniques for configuring, initiating, maintaining and/or terminating the air interfaces 120 are known to persons of ordinary skill in the art and in the interest of clarity only those aspects of configuring, initiating, maintaining, or terminating the air interfaces 120 that are relevant to the present invention will be discussed further herein. The access terminals 110 may attach a copy of their address (e.g., the source address) to packets transmitted over the air interfaces 120 and may attach the address of another access terminal 110 (e.g., the destination address) to direct the packets to the appropriate access terminal 110.

In the illustrated embodiment, the network element 105 includes a packet data switch node (PDSN) 125, which may be responsible for the establishment, maintenance, and/or termination of a Point-to-Point Protocol (PPP) session towards the access terminals 110. For example, the packet data switch node 125 may maintain IP-PPP tunnels between the packet data switch node 125 and the access terminals 110. As used herein, the term "tunnel" refers to an association between two entities that allows packets to be routed between the two entities, e.g., by extending the packets with a header that includes an address associated with a destination entity. Techniques for configuring and/or operating tunnels are known to persons of ordinary skill in the art and in the interest of clarity only those aspects of tunneling that are relevant to the present invention will be discussed further herein.

The network element 105 may also include one or more foreign agents 130. The foreign agents 130 are typically a part of the PDSN protocol suite implemented in a network element 105 and may be responsible for providing connectivity between access terminals 110 and a distributed network. For example, the foreign agents 130 may provide point of attachment and/or care of address (CoA) functionality for the access terminals 110.

The illustrated network element 105 also includes a visitor list 135. In one embodiment, the visitor list 135 is a database including information associated with each of the access terminals 110 that are associated with the network element 105. In one embodiment, the information included in the visitor list 135 includes the link-layer source address of each access terminal 110 (e.g., a PPP end-point address), a home address associated with each access terminal 110, a home agent IP address for each access terminal 110, and the like. In another embodiment, the visitor list 135 also maintains a key or tag identifying the address pool from which the home address is allocated. The key may be a per-HA identifier and may be transmitted to the home agent 115 through, for example, a generic routing encapsulation (GRE) IP-in-IP tunnel to articulate the association of a packet to a particular address pool.

In operation, the access terminals 110 may communicate by transmitting packets over the air interfaces 120 by way of the base stations 107. For example, packets may be transmitted from access terminal 110(1) over the air interface 120(1), e.g., over a forward link, to access terminal 110(2) over the air interface 120(2), e.g., over a reverse link. The transmitted packets each have packet headers that include information indicative of the source and destination addresses of the information included in the packets. For example, the packets transmitted by the access terminal 110(1) and destined for the access terminal 110(2) may include a packet header that holds the HoA IP address of the access terminal 110(1) in the source address field and the HoA IP address of the access terminal 110(2) in the destination address field. However, persons of ordinary skill in the art having benefit of the present disclosure should appreciate that the packet header may include other information, such as information associated with the information encapsulated or included in the packet The packet data switch node 125 may route packets received from the access terminals 110 based upon the source and destination addresses. In one embodiment, the packet data switch node 125 may search the visitor list 135 for the destination address. If the destination address is found in the visitor list 135, which may indicate that the source and destination addresses were assigned from the same address range or are in the same address pool, the packet data switch node 125 may route packets to the destination address along a communication path that bypasses, and thus does not include, the home agent 115. For example, if the packet data switch node 125 receives a packet that has a packet header that holds the IP address of the access terminal 110(1) in the source address field and the IP address of the access terminal 110(2) in the destination address field, then the packet data switch node 125 may route the packet directly to the access terminal 110(2) without forwarding the packet to the home agent 115.

Routing packets directly to end-points along a communication path that bypasses the home agent 115 may be referred to as performing a "cut through" or "cutting through" the wireless communication system 100. The cut-through communication path includes both a forward link and a reverse link. For example, the cut-through communication path may extend from access terminal 110(1) over the air interface 120(1), e.g., over a forward link, to the network element 105 and on to access terminal 110(2) over the air interface 120(2), e.g., over a reverse link. However, the cut-through communication path does not include the home agent 115 and packets are not routed to the home agent 115 when they travel along the cut-through communication path.

The packet data switch node 125 may also route packets received from the access terminals 110 based upon the other information. In one embodiment, the packet data switch node 125 may decide to cut-through at the PDSN level by comparing the home agent's IP addresses on both PPP tunnels in addition to comparing destination addresses on the visitor list. In another embodiment, the packet data switch node 125 may decide to cut-through at the PDSN level by comparing additional address pool tags in the visitor list, such as GRE-tunnel keys, to make a favorable decision. For example, a cut-through in the PDSN 125 can be established when the PDSN 125 can assert that both source and destination IP address are allocated from the same address pool maintained by the home agent 115, as may be indicated by the address pool tags.

Figure 2:
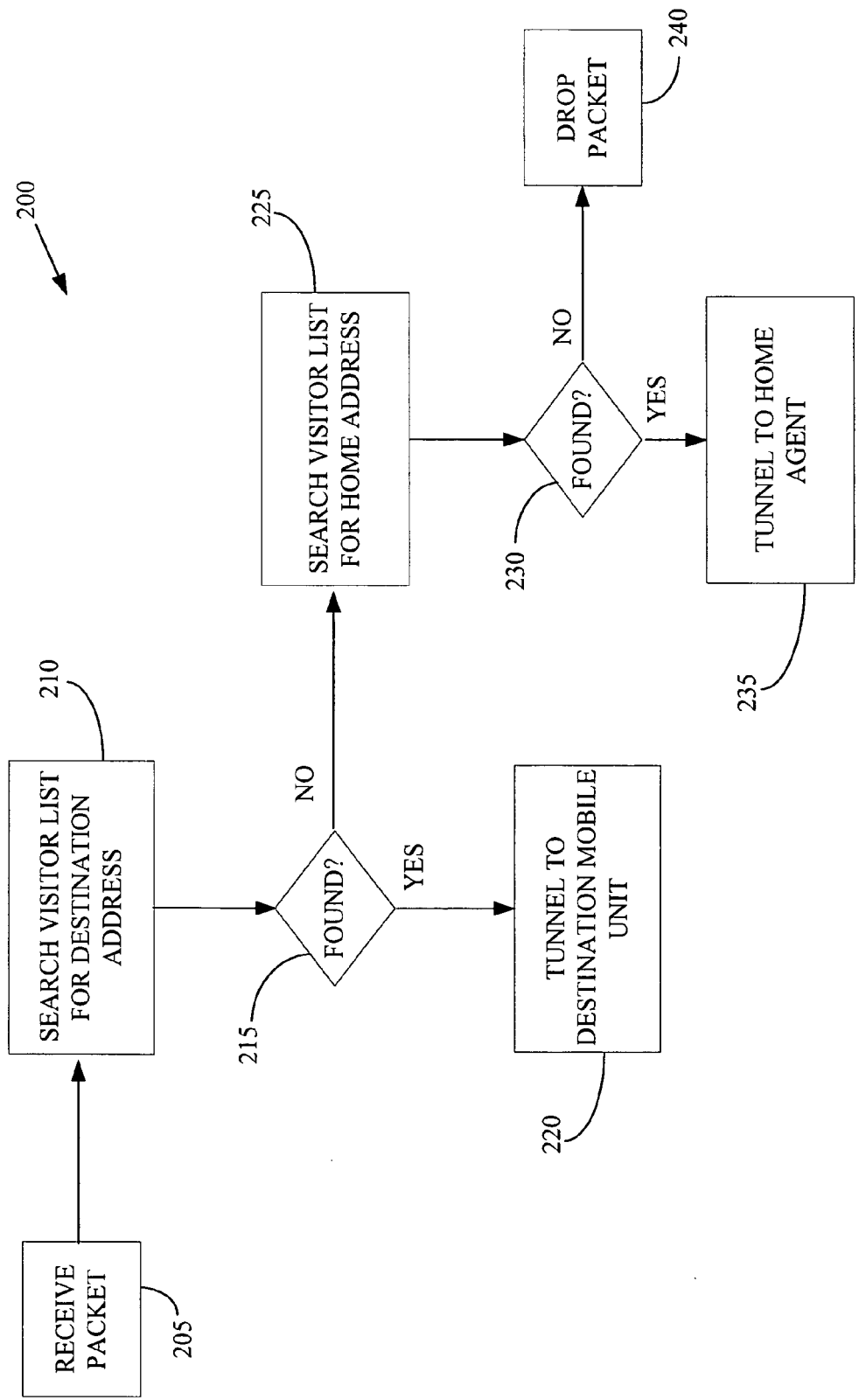
FIG. 2 conceptually illustrates one exemplary embodiment of a method of route optimization, in accordance with the present invention.

FIG. 2 conceptually illustrates one exemplary embodiment of a method 200 of route optimization. In the illustrated embodiment, one or more packets may be received (at 205), e.g., at an Internet termination point such as a packet data switch node. The packets may include information indicating a source address and a destination address associated with the packet. A visitor list may then be searched (at 210) for a mobile unit whose mobile node home address matches the destination address. In one embodiment, a home agent may serve more than one address base and so the source and/or destination addresses included in the packet headers may not be unique. Accordingly, the visitor list may be searched (at 210) for a mobile unit whose mobile node home address and associated home agent address (or other information indicative of the address base) match the destination address and the home agent address associated with the source mobile unit.

If the destination address is found (at 215) in the visitor list, indicating that the destination mobile unit is associated with the same Internet protocol termination point as the source mobile unit that transmitted the packets, then the packet may be tunneled (at 220) to the destination mobile unit without being forwarded to a home agent. For example, the packet may be forwarded (at 220) to the link-layer address, i.e., the PPP tunnel end-point address, associated with the destination mobile unit. However, in some cases, the packets may not be tunneled (at 220) to the destination mobile unit even if the destination address is found (at 215) in the visitor list. For example, if the destination address is a private home address within a different network address translation domain than the source address, the packet may instead be sent to the home agent associated with the source mobile unit.

If the destination address is not found (at 215) in the visitor list, indicating that the destination mobile unit is not associated with the same Internet protocol termination point as the source mobile unit that transmitted the packets, then the visitor list may be searched (at 225) for an entry whose mobile node home address matches the source address in the packet header of the packet. If a mobile node home address entry that matches the source address is found (at 230), the packet may be tunneled (at 235) to the home agent address corresponding to this entry. If no mobile node home address entry that matches the source address is found (at 230), the packet may be dropped (at 240).

Employing one or more embodiments of the techniques described above may have a number of advantages over conventional practice. For example, route optimization at the packet data switch node level may allow cellular providers to optimize traffic flows through that backhaul network. For example, IP data traffic over wireless networks is generally expected to increase over the next few years. Being able to cut through traffic at the packet data switch node level may allow at least part of this traffic to be delivered directly without having to backhaul the traffic to a central home agent. If both end-points of a PPP session terminate at the same packet data switch node, there is no reason to send IP packets through a home agent. The provider may therefore be able to sustain more IP data sessions without necessarily having to scale up the home agent (or number of home agent's) and/or the network connecting the packet data switch nodes and the home agent. In some cases, the level of cut-through optimizations may be tied to the geographical region served by each packet data switch node. For example, in cases where the PPP sessions are terminated at the edge, e.g. inside of a base station router, a somewhat lower number of cut-through operations may be performed. In contrast, in cases where a packet data switch node is approximately co-located with a home agent, the number of cut-through operations may be relatively large.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving, at a packet data switch node, a packet associated with a first address that is associated with a first mobile unit by a first home agent; and
   routing the packet from the packet data switch node to a second address associated with a second mobile unit along a forward link of a communication path that bypasses the first home agent when the packet data switch node terminates a first session with the first mobile unit and a second session with the second mobile unit.

2. The method of claim 1, wherein receiving the packet comprises receiving the packet from the first mobile unit via at least one base station.

3. The method of claim 1, wherein routing the packet comprises routing the packet from the packet data switch node to the second mobile unit through an Internet Protocol-Point-to-Point Protocol (IP-PPP) tunnel between the first and second addresses when the packet data switch node terminates a first PPP session with the first mobile unit and a second PPP session with the second mobile unit.

4. The method of claim 3, wherein routing the packet comprises determining whether the first and second addresses are allocated from either the same home network address range or the same address pool using information stored in the packet data switch node.

5. The method of claim 3, wherein routing the packet comprises routing the packet from the packet data switch node to the second mobile unit when both the first and second address are allocated from the same address pool maintained by the first home agent.

6. The method of claim 5, wherein determining whether the first and second addresses are from the same address pool comprises determining whether the first and second mobile units are in a visitor list maintained by the packet data switch node.

7. The method of claim 6, wherein routing the packet through the IP-PPP tunnel comprises determining a tunnel endpoint address associated with the second mobile unit based on the visitor list.

8. The method of claim 7, wherein routing the packet comprises tunneling the packet from the packet data switch node to the second mobile unit through the IP-PPP tunnel based on the tunnel endpoint address.

9. The method of claim 6, wherein routing the packet comprises routing the packet by comparing address pool tags in the visitor list.

\* \* \* \* \*